US010253176B2

(12) United States Patent
Negishi et al.

(10) Patent No.: US 10,253,176 B2
(45) Date of Patent: Apr. 9, 2019

(54) METHOD FOR PRODUCING RESIN ADDITIVE COMPOSITION AND RESIN ADDITIVE COMPOSITION

(71) Applicant: ADEKA CORPORATION, Tokyo (JP)

(72) Inventors: Yoshinori Negishi, Saitama (JP); Shinichi Ishikawa, Saitama (JP); Koichi Yuno, Saitama (JP)

(73) Assignee: ADEKA CORPORATION, Tokyo (JP)

(*) Notice: Subject to any disclaimer, the term of this patent is extended or adjusted under 35 U.S.C. 154(b) by 0 days.

(21) Appl. No.: 15/542,717

(22) PCT Filed: Feb. 10, 2016

(86) PCT No.: PCT/JP2016/053899
§ 371 (c)(1),
(2) Date: Jul. 11, 2017

(87) PCT Pub. No.: WO2016/132980
PCT Pub. Date: Aug. 25, 2016

(65) Prior Publication Data
US 2017/0349741 A1    Dec. 7, 2017

(30) Foreign Application Priority Data

Feb. 17, 2015  (JP) ................. 2015-028890
Feb. 17, 2015  (JP) ................. 2015-028891

(51) Int. Cl.
| | |
|---|---|
| *C08L 53/02* | (2006.01) |
| *C08L 23/06* | (2006.01) |
| *C08L 25/06* | (2006.01) |
| *C08J 3/22* | (2006.01) |
| *C08K 9/12* | (2006.01) |
| *C08K 5/00* | (2006.01) |

(52) U.S. Cl.
CPC ............ *C08L 53/02* (2013.01); *C08J 3/226* (2013.01); *C08K 9/12* (2013.01); *C08L 23/06* (2013.01); *C08L 25/06* (2013.01); *C08J 2323/06* (2013.01); *C08J 2425/04* (2013.01); *C08K 5/005* (2013.01); *C08K 5/0066* (2013.01)

(58) Field of Classification Search
CPC .......... C08L 53/02; C08L 23/06; C08L 25/06
USPC ....................................... 524/505
See application file for complete search history.

(56) References Cited

U.S. PATENT DOCUMENTS

| | | | | |
|---|---|---|---|---|
| 3,287,309 A | * | 11/1966 | Basdekis ............. | C08J 3/203 521/139 |
| 5,837,759 A | | 11/1998 | Trauth et al. | |
| 8,173,735 B2 | * | 5/2012 | Saitou ................. | C08J 3/226 524/450 |
| 2009/0088513 A1 | | 4/2009 | Yukino et al. | |
| 2013/0065994 A1 | | 3/2013 | Yokota et al. | |

FOREIGN PATENT DOCUMENTS

| | | |
|---|---|---|
| EP | 2 980 129 | 2/2016 |
| JP | 63-191834 | 8/1988 |
| JP | H08-109269 | 4/1996 |
| JP | 09-241422 | 9/1997 |
| JP | 09241422 A * | 9/1997 |
| JP | 11-513330 | 11/1999 |
| JP | 2003-041008 | 2/2003 |
| JP | 2004-169027 | 6/2004 |
| JP | 2009-179746 | 8/2009 |
| JP | 2011-527353 | 10/2011 |
| JP | 2014-189679 | 10/2014 |
| WO | WO 2007/000876 | 1/2009 |
| WO | 2013-057841 | 4/2013 |

OTHER PUBLICATIONS

Translation of JP 09-241422, Sep. 16, 1997. (Year: 1997).*
Noish, Tris(2,3-dibromopropyl) phosphate, Jul. 1, 2014. (Year: 2014).*
International Search Report, PCT/JP2016/053899, dated Apr. 26, 2016.
Extended European Search Report for Application No. 16752366, dated Sep. 25, 2018.

* cited by examiner

*Primary Examiner* — Hui H Chin
(74) *Attorney, Agent, or Firm* — Young & Thompson

(57) ABSTRACT

A method for producing a resin additive composition is a method for handling, as a solid, a compound that can maintain a liquid state or fluid state at 100° C. for 30 minutes or longer, and includes causing 100 parts by mass of a styrene-based elastomer (A) to be mixed with 50 to 250 parts by mass of a compound (B) that can maintain a liquid state or fluid state at 100° C. for 30 minutes or longer. A resin additive composition is obtained by mixing 100 parts by mass of a styrene-based elastomer (A) with 50 to 250 parts by mass of a compound (B) having a melting point of 100° C. or lower.

10 Claims, No Drawings

METHOD FOR PRODUCING RESIN ADDITIVE COMPOSITION AND RESIN ADDITIVE COMPOSITION

TECHNICAL FIELD

The present invention relates to a method for producing a resin additive composition that improves handleability of a low melting point composition. More specifically, by mixing a styrene-based elastomer with a resin additive in a liquid state or fluid state to form a solid, an excellent blocking resistance (storage stability) effect is provided. Moreover, the present invention relates to a method for improving handleability of a low melting point composition. More specifically, the present invention relates to a resin additive composition obtained by mixing a styrene-based elastomer with a resin additive having a melting point of 100° C. or lower to form a solid so as to improve the handleability.

BACKGROUND ART

Liquid compounds or low melting point compounds that are likely to turn into a liquid state in a high temperature environment or by pressure application are more difficult to handle compared with solid compounds, and therefore, various methods for improving the handleability have been conventionally investigated.

For example, hindered amine compounds obtained by reacting stearyl(3,5-di-tert-butyl-4-hydroxyphenyl)propionate, bis(2,2,6,6-tetramethyl-4-piperidyl) sebacate, or a 2,2,6,6-tetramethyl piperidinol with a fatty acid are resin additives that provide excellent weather resistance. However, the hindered amine compounds have a low molecular weight and are likely to turn into a liquid state, and liquid products thereof are viscous and have poor handleability.

With regard to a method for improving the handleability of a low melting point compound, Patent Literature 1 proposes a method of impregnating therewith an inorganic substance in a powder state having an oil absorption of 150 ml/100 g or more, for example. Patent Literature 2 proposes a method of forming a masterbatch thereof by blending it into a resin. Patent Literature 3 states that a metal salt of an organic acid is used to form a masterbatch thereof, thus suppressing stickiness and preventing breakage of strands or exudation from the masterbatch during granulation. Patent Literature 4 proposes a microencapsulation method. Patent Literature 5 proposes a masterbatch obtained by blending a resin additive, an inorganic layered compound, a metal salt of aromatic phosphate, and a benzotriazole-based ultraviolet absorber into a polyolefin resin.

A super absorbent polymer is a cross-linked polymer containing sodium polyacrylate as a main component, and it is known that water, which is a liquid, is absorbed by the super absorbent polymer and thus can turn into a solid through gelation. It is also known that a gelling agent is used to cause waste cooking oil to turn into a solid in order to dispose it as a combustible waste.

CITATION LIST

Patent Literature

Patent Literature 1: US 2009/088513A1
Patent Literature 2: JP 2003-41008A
Patent Literature 3: US 2013/065994A1
Patent Literature 4: U.S. Pat. No. 5,837,759A
Patent Literature 5: EP 2980129A1

SUMMARY OF INVENTION

Technical Problem

However, in the method of impregnating an inorganic substance, a mixing apparatus may be worn when impregnation is performed while stirring the inorganic substance. Moreover, when an inorganic substance is blended into a synthetic resin, there are cases where the transparency of a molded article is impaired, the weight of a molded article is increased, and stable production cannot be achieved due to the production of defective products in a fiber application or a film application.

With regard to the method of impregnation of an organic substance, a method of impregnation of a vinyl chloride resin, an elastomer, or the like is conceivable, but a problem arises in that compatibility with a resin serving as a matrix needs to be taken into consideration. When impregnation of an organic substance that has poor compatibility with the matrix is performed, the transparency of the resin may be impaired, and the properties may deteriorate.

Patent Literature 2 proposes a method of forming a masterbatch to bring an additive in a liquid state into a solid state. Patent Literature 3 proposes a method of forming a masterbatch by blending a resin additive in a liquid state, a metal salt of an organic acid other than a fatty acid, and a gelling agent into a crystalline resin. Patent Literature 5 proposes a method of forming a masterbatch by blending an inorganic layered compound. However, the masterbatch may be colored, or the low melting point compound may deteriorate or volatilize, depending on a temperature at which the masterbatch is formed.

The formation of a masterbatch is a method of melting and kneading a resin, and therefore, a problem arises in that energy consumption increases. Moreover, the masterbatch may be blocked due to the exudation of the low melting point compound from the masterbatch over time, and this causes a problem in that the blend amount of the low melting point compound has to be limited.

It is expensive to perform the microencapsulation method in Patent Literature 4. When the crystallization is promoted, the handleability is improved compared with an amorphous substance, but this method cannot be used for a liquid article. Furthermore, if a crystallized article has a low melting point, a caking prevention effect is reduced, and thus the handleability is insufficiently improved. Moreover, in a gelation method, flowing out may easily occur merely through the application of a little pressure, and a gelling agent may decompose during processing to color the resin additive composition in a case where the gelling agent has insufficient thermal resistance.

Therefore, an object of the present invention, which relates to a production method for improving handleability of a resin additive that is a low melting point compound, is to provide a method for producing a resin additive composition that has excellent blocking resistance (storage stability) and can be blended into a synthetic resin to provide a resin additive function without greatly impairing the properties derived from the resin, even in an environment in which a temperature varies significantly, for example.

In addition, an object of the present invention, which relates to improving handleability of a resin additive that is a low melting point compound, is to provide a resin additive composition that can prevent blocking during storage at ordinary temperature when a low melting point compound is used as a resin additive, for example, and that can be blended into a resin to provide an excellent stabilizing effect without greatly impairing the properties such as transparency derived from the resin.

The inventors of the present invention conducted intensive research in order to solve the foregoing problems. As a result, the foregoing problems were solved by mixing a styrene-based elastomer with a low melting point compound.

That is, the present invention provides a method for producing a resin additive composition, the method being a method for handling, as a solid, a compound that can maintain a liquid state or fluid state at 100° C. for 30 minutes or longer, the method including mixing 100 parts by mass of a styrene-based elastomer (A) with 50 to 250 parts by mass of a compound (B) that can maintain a liquid state or fluid state at 100° C. for 30 minutes or longer.

In addition, the present invention provides a resin additive composition containing 50 to 250 parts by mass of a compound (B) that can maintain a liquid state or fluid state at 100° C. for 30 minutes or longer with respect to 100 parts by mass of a styrene-based elastomer (A). Hereinafter, "(A) styrene-based elastomer" is referred to merely as "above elastomer (A)" or "(A) component", and "compound that can maintain a liquid state or fluid state at 100° C. for 30 minutes or longer" is referred to merely as "compound (B)", "(B) component", or the like. The "method for handling, as a solid," as used herein refers to a method of mixing an (A) component in a solid state with a (B) component that is a solution or in a fluid state, and encompasses a case where an (A) component is mixed with a heated (B) component and then cooled so that the (B) component turns into a solid. "Mixing an (A) component with a (B) component" means that both the components are caused to coexist in a contact state.

In the production method of the present invention, it is preferable to mix the above compound (B) in a liquid state or fluid state with the above elastomer (A) in a solid state to impregnate the above elastomer (A) with the compound (B). It is preferable that the resin additive composition of the present invention is in a state in which the above elastomer (A) is impregnated with the above compound (B).

In the present invention, a resin additive having a melting point of 100° C. or lower is preferably used as the above compound (B). All descriptions of the compound (B) below apply to resin additives having a melting point of 100° C. or lower unless otherwise stated.

In the present invention, a hydrogenated styrene-butadiene-styrene copolymer is preferably used as the above elastomer (A).

In the present invention, out of resin additives having a melting point of 100° C. or lower, a compound selected from a hindered amine compound, a phenol-based antioxidant, a phosphorus-based antioxidant, a thioether-based antioxidant, an ultraviolet absorber, and a flame retardant is preferably used as the above compound (B).

It is preferable that the hindered amine compound serving as the above compound (B) is a compound represented by Formula (1) below.

[Chem. 1]

(1)

(In Formula (1), $A^1$ represents —O—(CH$_2$CH$_2$)$_a$—, —(OCH$_2$CH$_2$)$_a$—, —(CH$_2$CH$_2$)$_a$—O—, —(CH$_2$CH$_2$O)$_a$—, —CH$_2$CH$_2$—(C=O)—, —O—(C=O)—, —(C=O)—O—, —O—(C=O)—O—, —NH—, —NH—(CH$_2$CH$_2$)$_a$—, —NH—CH$_2$CH$_2$—(C=O)—O—, or a combination thereof, a represents an integer between 1 and 100, and j represents an integer between 1 to 4;

when j is 1, $X^1$ represents a hydrogen atom, a hydroxy group, a branched or linear alkyl group having 1 to 30 carbon atoms, an alkenyl group having 2 to 30 carbon atoms, or a group represented by Formula (2) or Formula (3), and $R^1$ represents a group represented by Formula (3);

when j is 2,
$X^1$ represents an alkylidene group having 1 to 40 carbon atoms, and
$R^1$ represents a branched or linear alkyl group having 1 to 40 carbon atoms or a group represented by Formula (3), and at least one $R^1$ represents a group represented by Formula (3);

when j is 3,
$X^1$ represents an alkanetriyl group having 1 to 40 carbon atoms, and
$R^1$ represents a branched or linear alkyl group having 1 to 40 carbon atoms or a group represented by Formula (3), and at least one $R^1$ represents a group represented by Formula (3); and when j is 4,
$X^1$ represents an alkanetetrayl group having 1 to 40 carbon atoms, and
$R^1$ represents a branched or linear alkyl group having 1 to 40 carbon atoms or a group represented by Formula (3), and at least one R1 represents a group represented by Formula (3) excluding a compound having a peroxide structure.)

[Chem. 2]

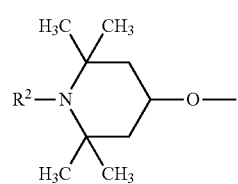

(2)

($R^2$ represents a hydrogen atom, a hydroxy group, a branched or linear alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxy-radical.)

[Chem. 3]

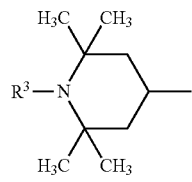

(3)

($R^3$ represents any of the atoms or groups represented by R2 in Formula (2).)

It is more preferable that the hindered amine compound serving as the above compound (B) is a compound represented by Formula (4) below.

[Chem. 4]

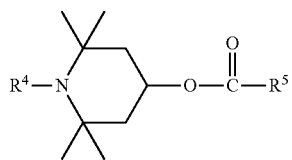

(4)

(In Formula (4), $R^4$ represents a hydrogen atom, a hydroxy group, a branched or linear alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxy-radical, and R5 represents a branched or linear alkyl group having 1 to 30 carbon atoms, an alkenyl group having 2 to 30 carbon atoms, or a group represented by Formula (2).)

In addition to the compound represented by Formula (1) above, a preferred example of the hindered amine compound serving as the above compound (B) is an NO-alkyl type hindered amine compound having a triazine structure or a spiroglycol structure.

It is preferable that the phenol-based antioxidant serving as the above compound (B) is a compound represented by Formula (5) below.

[Chem. 4A]

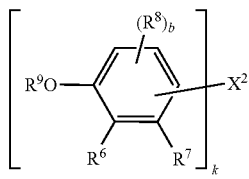

(5)

(In the formula, $R^6$, $R^7$, and $R^8$ independently represent a hydrogen atom or a hydrocarbon group having 1 to 10 carbon atoms, b represents an integer between 0 to 2, and when b is 2, a plurality of $R^8$s are optionally the same or different.

k represents an integer between 1 to 4;

when k is 1, $X^2$ represents a branched or linear alkyl group having 1 to 40 carbon atoms, an alkoxy group having 1 to 40 carbon atoms, an aryl group having 6 to 40 carbon atoms, an arylenealkyl group having 7 to 40 carbon atoms, or a combination thereof, and $R^9$ represents a hydrogen atom;

when k is 2, $X^2$ represents an alkylidene group having 1 to 40 carbon atoms or an arylene group having 6 to 40 carbon atoms, and $R^9$ represents a hydrogen atom or a hydrocarbon group having 1 to 10 carbon atoms, and at least one $R^9$ represents a hydrogen atom;

when k is 3, $X^2$ represents an alkanetriyl group having 1 to 40 carbon atoms or a trivalent cyclic group having 6 to 40 carbon atoms, and $R^9$ represents a hydrogen atom or a hydrocarbon group having 1 to 10 carbon atoms, and at least one $R^9$ represents a hydrogen atom;

When k is 4, $X^2$ represents an alkanetetrayl group having 1 to 40 carbon atoms, and $R^9$ represents a hydrogen atom or a hydrocarbon group having 1 to 10 carbon atoms, and at least one $R^9$ represents a hydrogen atom; and a methylene group in the above-mentioned alkyl group, alkoxy group, arylenealkyl group, alkylidene group, alkanetriyl group, and alkanetetrayl group is optionally substituted with >C=O, —O—, —S—, —CO—O—, —O—CO—, —O—CO—O—, —$NR^{10}$—, phosphine, phosphinite, phosphonite, phosphite, phosphorane, phosphonate, phosphite, or a combination thereof, and these groups are optionally branched. $R^{10}$ represents a hydrogen atom or a branched or linear alkyl group having 1 to 4 carbon atoms.)

It is preferable that the phosphorus-based antioxidant serving as the above compound (B) is a compound represented by Formula (6) or (7) below.

[Chem. 5]

(6)

(In the formula, $R^{11}$ and $R^{12}$ independently represent a branched or linear alkyl group having 1 to 40 carbon atoms or an aryl group having 6 to 40 carbon atoms.)

[Chem. 6]

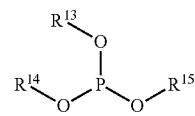

(7)

(In the formula, $R^{13}$, $R^{14}$, and $R^{15}$ independently represent a hydrogen atom, a branched or linear alkyl group having 1 to 40 carbon atoms, an aryl group having 6 to 40 carbon atoms, an arylenealkyl group having 7 to 40 carbon atoms, or a heterocycle-containing group having 3 to 25 carbon atoms.)

It is preferable that the thioether-based antioxidant serving as the above compound (B) is a compound represented by any one of Formulas (8) to (10) below.

[Chem. 7]

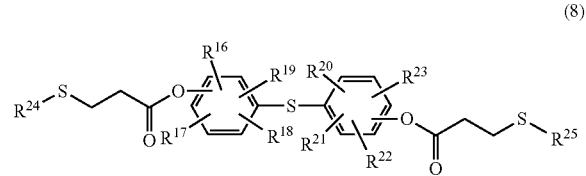

(8)

(In the formula, $R^{16}$ to $R^{23}$ independently represent a branched or linear alkyl group having 1 to 40 carbon atoms, a cycloalkyl group having 3 to 18 carbon atoms, or an aryl group having 6 to 40 carbon atoms, and $R^{24}$ and $R^{25}$ independently represent a branched or linear alkyl group having 1 to 40 carbon atoms.)

[Chem. 8]

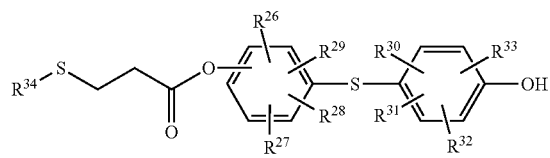

(9)

(In the formula, $R^{26}$ to $R^{33}$ independently represent a hydrogen atom, a branched or linear alkyl group having 1 to 40 carbon atoms, a cycloalkyl group having 3 to 18 carbon atoms, or an aryl group having 6 to 40 carbon atoms, and
$R^{34}$ represents a branched or linear alkyl group having 1 to 40 carbon atoms.)

[Chem. 9]

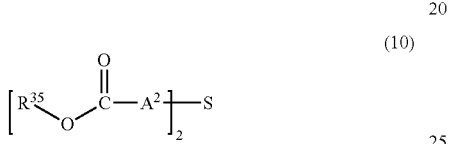

(10)

(In the formula, $R^{35}$ represents a branched or linear alkyl group having 1 to 40 carbon atoms, and
$A^2$ represents an alkylene group having 1 to 8 carbon atoms.)

It is preferable that the flame retardant serving as the above compound (B) is a compound represented by Formula (11) below.

[Chem. 10]

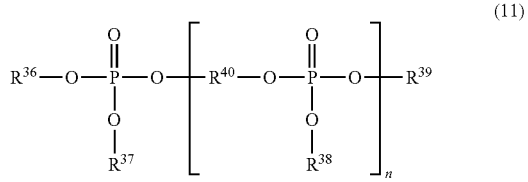

(11)

(In the formula, $R^{36}$ to $R^{39}$ independently represent a hydrogen atom, a branched or linear alkyl group having 1 to 40 carbon atoms, or an aryl group having 6 to 40 carbon atoms,
n represents an integer between 1 to 5, and
$R^{40}$ represents a bifunctional aromatic group having 6 to 20 carbon atoms.)

It is preferable that the resin additive composition of the present invention can be obtained by mixing the styrene-based elastomer (A) with the above compound (B) in a liquid state or fluid state and thus be handled as a solid.

A synthetic resin composition of the present invention contains the resin additive composition, wherein the component (B) contained in the resin additive composition is contained in a range of an amount of 0.01 to 10 parts by mass with respect to 100 parts by mass of a synthetic resin.

In the present invention, it is preferable that the synthetic resin is a polyethylene resin.

Advantageous Effects of Invention

With the production method of the present invention, the above compound (B) can turn into a solid without heating and melting the styrene-based elastomer (A), thus making it possible to prevent the deterioration of the above compound (B) due to heating and to produce a resin additive composition that has excellent properties of retaining the above compound (B). Moreover, an excellent blocking resistance (storage stability) effect is provided even in an environment in which a temperature varies significantly.

With the resin additive composition of the present invention, the above compound (B) can turn into a solid without heating and melting the styrene-based elastomer (A), and therefore, the deterioration of the above compound (B) due to heating can be prevented, and the resin additive composition has excellent properties of retaining the above compound (B). Moreover, blending the resin additive composition into a synthetic resin makes it possible to provide the effect of a resin additive without greatly impairing the properties of the synthetic resin.

DESCRIPTION OF EMBODIMENTS

Hereinafter, an embodiment of the present invention will be described specifically.

The styrene-based elastomer (A) in the present invention includes a block copolymer (X) of aromatic vinyl compounds such as styrene, α-methylstyrene, 3-methylstyrene, and 4-propylstyrene, and a block copolymer (Y) of conjugated diene monomers such as butadiene, isoprene, and a mixture thereof. Butadiene, isoprene, or a mixture of isoprene and butadiene is preferably used as the conjugated diene monomer from the viewpoint of the low-temperature properties and flexibility of the obtained block copolymer and a composition including this block copolymer. Moreover, it is preferable to hydrogenate a double bond based on a conjugated diene in a block copolymer (Y) constituted by the conjugated dienes. This hydrogenation rate is 60% or higher and preferably 80% or higher. If the hydrogenation rate is lower than 60%, problems of thermal deterioration during molding and preservability of the obtained resin additive composition may arise.

The styrene-based elastomer in the present invention includes two or more block copolymers (X) of aromatic vinyl compounds and one or more block copolymers (Y) of conjugated dienes, and its form is represented by X–(Y–X)u or (X–Y)t where u represents an integer of 1 or greater and t represents an integer of 2 or greater. It is preferable that the styrene-based elastomer in the present invention has a form of X–Y–X.

In the present invention, the density of the (A) styrene-based elastomer is preferably 1 g/cm3 or less, and more preferably 0.89 g/cm3 to 0.98 g/cm3.

The content of polystyrene in the (A) styrene-based elastomer is preferably 5 mass % or more and 80 mass % or less, and more preferably 10 mass % or more and 70 mass % or less. The content of polystyrene can be measured using a method of measuring iodination in accordance with the Wijs method.

The styrene-based elastomer (A) used in the production method of the present invention and the styrene-based elastomer (A) contained in the resin additive composition are preferably in a powder form, and more preferably in a powder form that particularly has a volume averaged particle diameter of preferably 0.01 µm to 5 mm and more preferably 0.1 µm to 500 µm. The volume averaged particle diameter of the styrene-based elastomer refers to a numerical value obtained through calculation in accordance with the following formula when transmission electron micrographs of samples obtained by using an ultrathin section method are taken and the circle equivalent particle diameters of 1000 styrene-based elastomer particles are measured.

Volume averaged particle diameter of styrene-based elastomer: $(\Sigma n_i D_i^4)/(\Sigma n_i D_i^3)$ ($n_i$ represents the number of styrene-based elastomer particles having a circle equivalent particle diameter of Di (μm).)

Examples of the styrene-based elastomer (A) used in the present invention include butadiene-styrene copolymers (including all of random copolymers, block copolymers, graft copolymers, and the like) and hydrogenated products thereof such as a styrene-butadiene-styrene copolymer (e.g., SBS), a hydrogenated styrene-butadiene-styrene copolymer (e.g., SEBS), a hydrogenated styrene-butadiene copolymer (e.g., HSBR), and a hydrogenated styrene-butadiene-olefin crystal block copolymer (e.g., SEBC); and isoprene-styrene copolymers (including all of random copolymers, block copolymers, graft copolymers, and the like) and hydrogenated products thereof such as a hydrogenated styrene-isoprene copolymer (e.g., SEP), a hydrogenated styrene-vinylisoprene copolymer (e.g., V-SEPS), a styrene-isoprene-styrene copolymer (e.g., SIS), and a hydrogenated styrene-isoprene-styrene copolymer (e.g., SEPS). These copolymers may be used alone or in combination of two or more.

In the present invention, in particular, a hydrogenated styrene-butadiene-styrene copolymer is preferably used as the styrene-based elastomer (A).

Next, the "compound (B) that can maintain a liquid state or fluid state at 100° C. for 30 minutes or longer" in the present invention refers to a compound having a melting point of 100° C. or lower, a compound having a melting point of higher than 100° C. that can maintain a liquid state or fluid state in which fluidity is exhibited for 30 minutes or longer after being heated to a temperature higher than or equal to the melting point to be brought into a liquid state or fluid state and then cooled to 100° C., and a compound having a melting point of higher than 100° C. whose melting point is lowered to 100° C. or lower when the compound is blended with another compound.

In the present invention, a compound having a melting point of 100° C. or lower is preferable because complex treatment is not required, and more preferably, a compound having a melting point of 50° C. or lower, particularly a compound that is brought into a liquid state at 25° C., is preferable because a handleability improving effect obtained through the formation of a solid becomes prominent. In this specification, "state in which fluidity is exhibited" mentioned above is also referred to as "fluid state".

The state of the above compound (B) in which fluidity is exhibited refers to a state in which a substance in a solid phase moves or flows without adhering to each other into a larger size in an ambient condition, and the viscosity measured using a B-type viscometer in conformity with JIS K5101-6-2 (2004) is 30,000 mPa·s or lower and preferably 10,000 Pa·s or lower, for example.

The state of the above compound (B) in which fluidity is exhibited may be a state in which a liquid phase and a solid phase coexist. In the present invention, a state in which a solid phase can be uniformly dispersed in a liquid phase is preferable.

Regarding the above compound (B), examples of the compound whose melting point is lowered to 100° C. or lower when the compound is blended with another compound include aliphatic alcohols and ester compounds made of a fatty acid, and preferred examples thereof include mixed ester compounds (mixed ester compounds) obtained from mixed alcohol and mixed fatty acid, and mixed amide compounds (mixed amide compounds).

In the present invention, the melting point is measured in a condition of a temperature rising speed of 1° C./min using a melting point measurement apparatus (model number: MP-90) manufactured by Mettler-Toledo. However, the melting point of a polymer cannot be measured using this apparatus, and therefore, regarding the melting point of a polymer, a polymer is heated at a temperature rising speed of 1° C./min under observation using a microscope, and a temperature at which the polymer melts is taken as the melting point of the polymer.

"Liquid at ordinary temperature" as used in the present invention refers to being in a liquid state in a condition of a temperature of 25° C.

In the resin additive composition of the present invention, it is preferable that the above compound (B) is a hindered amine compound, a phenol-based antioxidant, a phosphorus-based antioxidant, a thioether-based antioxidant, an ultraviolet absorber, or a flame retardant, and has a melting point of 100° C. or lower.

Examples of the hindered amine compound that has a melting point of 100° C. or lower and serves as the above compound (B) include bis(2,2,6,6-tetramethyl-4-piperidyl) sebacate (melting point: 82 to 87° C.), bis(1,2,2,6,6-pentamethyl-4-piperidyl) sebacate (liquid at ordinary temperature), methyl-1,2,2,6,6-pentamethyl-4-piperidyl sebacate (liquid at ordinary temperature), bis(1-octyloxy-2,2,6,6-pentamethyl-4-piperidyl) sebacate (melting point: 82 to 85° C.), bis(1-undecanoxy-2,2,6,6-tetramethylpiperidyl-4-yl) carbonate (liquid at ordinary temperature), 1,2,2,6,6-pentamethyl-4-piperidyl methacrylate (liquid at ordinary temperature), 2,2,6,6-tetramethyl-4-piperidyl methacrylate (liquid at ordinary temperature), tetrakis(1,2,2,6,6-pentamethyl-4-piperidyl) butane-1,2,3,4-tetracarboxylate (melting point: >65° C.), dimethyl-1-(2-hydroxyethyl)-4-hydroxy-2,2,6,6-tetramethyl-4-piperidine succinate polycondensate (Mw=3100 to 4000, melting point: 50 to 70° C.), a mixture of bis(1,2,2,6,6-pentamethyl-4-piperidyl) sebacate and methyl-1,2,2,6,6-pentamethyl-4-piperidyl sebacate (Tinuvin765 (former product name) manufactured by BASF, liquid at ordinary temperature), bis[2,2,6,6-tetramethyl-1-(octyloxy)piperidin-4-yl] decanedioate (liquid at ordinary temperature), a light stabilizer Tinuvin791 (product name) manufactured by BASF (melting point: 55° C.), a light stabilizer Tinuvin783 (former product name) manufactured by BASF (melting point: 55 to 140° C.), ADK STAB LA-81 (product name) manufactured by ADEKA Corporation (liquid at ordinary temperature), ADK STAB LA-62 (product name) manufactured by ADEKA Corporation (liquid at ordinary temperature), ADK STAB LA-67 (product name) manufactured by ADEKA Corporation (liquid at ordinary temperature), ADK STAB LA-68 (product name) manufactured by ADEKA Corporation (melting point: 70 to 80° C.), ADK STAB LA-63 (product name) manufactured by ADEKA Corporation (melting point: 80 to 90° C.), Sanduvor 3050 (product name) manufactured by Clariant Japan (liquid at ordinary temperature), Sanduvor 3052 (product name) manufactured by Clariant Japan (liquid at ordinary temperature), and Sanduvor 3058 (product name) manufactured by Clariant Japan (liquid at ordinary temperature).

In the present invention, a compound represented by Formula (1) below is preferably used.

[Chem. 11]

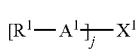
(1)

(In Formula (1), $A^1$ represents —O—$(CH_2CH_2)_a$—, —$(OCH_2CH_2)_a$—, —$(CH_2CH_2)_a$—O—, —$(CH_2CH_2O)_a$—, —$CH_2CH_2$—(C=O)—, —O—(C=O)—, —(C=O)—O—, —O—(C=O)—O—, —NH—, —NH—$(CH_2CH_2)_a$—, —NH—$CH_2CH_2$—(C=O)—O—, or a combination thereof, a represents an integer between 1 and 100, and j represents an integer between 1 to 4;

when j is 1, $X^1$ represents a hydrogen atom, a hydroxy group, a branched or linear alkyl group having 1 to 30 carbon atoms, an alkenyl group having 2 to 30 carbon atoms, or a group represented by Formula (2) or Formula (3), and $R^1$ represents a group represented by Formula (3);

when j is 2, $X^1$ represents an alkylidene group having 1 to 40 carbon atoms, and $R^1$ represents a branched or linear alkyl group having 1 to 40 carbon atoms or a group represented by Formula (3), and at least one $R^1$ represents a group represented by Formula (3);

when j is 3, $X^1$ represents an alkanetriyl group having 1 to 40 carbon atoms, and $R^1$ represents a branched or linear alkyl group having 1 to 40 carbon atoms or a group represented by Formula (3), and at least one $R^1$ represents a group represented by Formula (3); and when j is 4, $X^1$ represents an alkanetetrayl group having 1 to 40 carbon atoms, and $R^1$ represents a branched or linear alkyl group having 1 to 40 carbon atoms or a group represented by Formula (3), and at least one $R^1$ represents a group represented by Formula (3) excluding a compound having a peroxide structure.)

[Chem. 12]

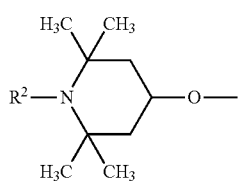
(2)

(In the formula, $R^2$ represents a hydrogen atom, a hydroxy group, a branched or linear alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxy-radical.)

[Chem. 13]

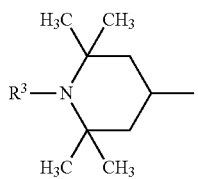
(3)

(In the formula, $R^3$ represents any of the atoms or groups represented by R2 in Formula (2).)

Examples of the branched or linear alkyl group having 1 to 30 carbon atoms represented by $X^1$ in Formula (1) above, $R^2$ in Formula (2), and $R^3$ in Formula (3), and the branched or linear alkyl group having 1 to 40 carbon atoms represented by $R^1$ in Formula (1) include methyl, ethyl, propyl, isopropyl, butyl, isobutyl, sec-butyl, tert-butyl, pentyl, sec-pentyl, tert-pentyl, hexyl, heptyl, octyl, isooctyl, 2-ethylhexyl, tert-octyl, nonyl, isononyl, decyl, undecyl, dodecyl, tridecyl, tetradecyl, pentadecyl, hexadecyl, heptadecyl, and octadecyl. $R^1$ and $R^2$ are optionally the same or different.

It is preferable that the hydroxyalkyl group having 1 to 30 carbon atoms represented by $R^2$ in Formula (2) and $R^3$ in Formula (3) is branched or linear, and examples thereof include substitution products such as hydroxyethyl, 2-hydroxypropyl, and 3-hydroxypropyl obtained by substituting the above-mentioned alkyl groups with a hydroxy group.

It is preferable that the alkoxy group having 1 to 30 carbon atoms represented by $R^2$ in Formula (2) and $R^3$ in Formula (3) is branched or linear, and examples thereof include methoxy, ethoxy, propoxy, isopropoxy, butoxy, octoxy, 2-ethylhexyloxy, and undecyloxy that correspond to the above-mentioned alkyl groups.

It is preferable that the hydroxyalkoxy group having 1 to 30 carbon atoms represented by $R^2$ in Formula (2) and $R^3$ in Formula (3) is branched or linear, and examples thereof include hydroxyethyloxy, 2-hydroxypropyloxy, 3-hydroxypropyloxy, 4-hydroxybutyloxy, 2-hydroxy-2-methylpropyloxy, and 6-hydroxyhexyloxy that correspond to the above-mentioned alkoxy groups.

It is preferable that the alkenyl group having 2 to 30 carbon atoms represented by $X^1$ in Formula (1) is branched or linear, and examples thereof include vinyl, 1-propenyl, 2-propenyl, 2-methyl-2-propenyl, butenyl, hexenyl, and oleyl. A double bond may be located at an α-position, an internal position, or an co-position.

Examples of the alkylidene group having 1 to 40 carbon atoms represented by $X^1$ in Formula (1) include groups obtained by removing one hydrogen atom from the above-mentioned alkyl groups shown as examples.

Examples of the alkanetriyl group having 1 to 40 carbon atoms represented by $X^1$ in Formula (1) include groups obtained by removing two hydrogen atoms from the above-mentioned alkyl groups shown as examples.

Examples of the alkanetetrayl group having 1 to 40 carbon atoms represented by $X^1$ in Formula (1) include groups obtained by removing three hydrogen atoms from the above-mentioned alkyl groups shown as examples.

In the present invention, out of the compounds represented by Formula (1), a hindered amine compound represented by Formula (4) is particularly preferable because excellent weather resistance can be provided to a synthetic resin.

[Chem. 14]

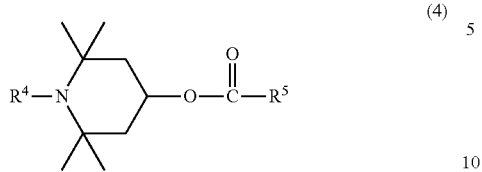

(In Formula (4), $R^4$ represents a hydrogen atom, a hydroxy group, a branched or linear alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxy-radical, and $R^5$ represents a branched or linear alkyl group having 1 to 30 carbon atoms, an alkenyl group having 2 to 30 carbon atoms, or a group represented by Formula (2).)

The branched or linear alkyl group, hydroxyalkyl group, alkoxy group, or hydroxyalkoxy group having 1 to 30 carbon atoms represented by $R^4$ in Formula (4) corresponds to $R^2$ in Formula (2), and it is preferable that the branched or linear alkyl group having 1 to 30 carbon atoms and the alkenyl group having 2 to 30 carbon atoms represented by $R^5$ in Formula (4) are branched or linear, and these groups correspond to $X^1$ in Formula (1).

More specific examples of the compounds represented by Formula (1) used in the present invention include the compounds below. However, the present invention is not limited to the compounds below.

It should be noted that a compound in which $X^1$ in Formula (1) above is RA is a mixture of hindered amine compounds in which $X^1$ in Formula (1) above is an alkyl group having 15 to 17 carbon atoms, a compound in which $X^1$ in Formula (1) above is RB is a mixture of hindered amine compounds in which $X^1$ in Formula (1) above is an alkyl group having 13 to 19 carbon atoms, and a compound in which $X^1$ in Formula (1) above is $R_C$ is a mixture of hindered amine compounds in which X1 in Formula (1) above is an alkyl group having 12 to 24 carbon atoms.

[Chem. 15]

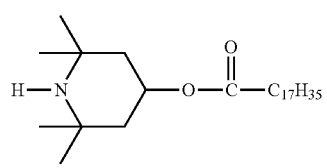

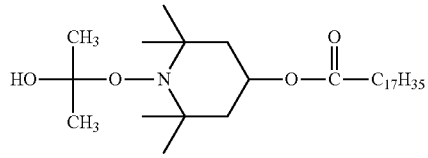

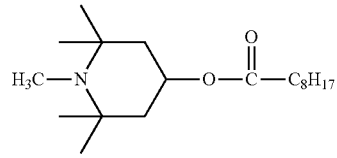

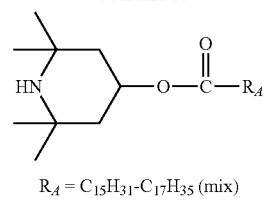

$R_A = C_{15}H_{31}$-$C_{17}H_{35}$ (mix)

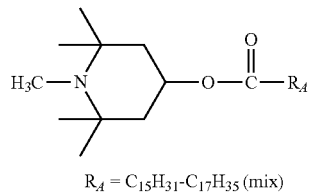

$R_A = C_{15}H_{31}$-$C_{17}H_{35}$ (mix)

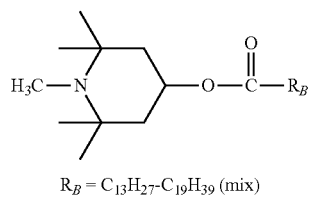

$R_B = C_{13}H_{27}$-$C_{19}H_{39}$ (mix)

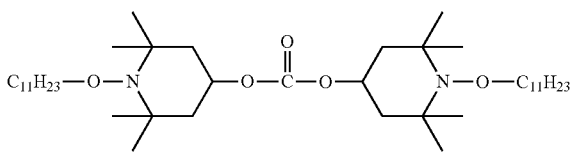

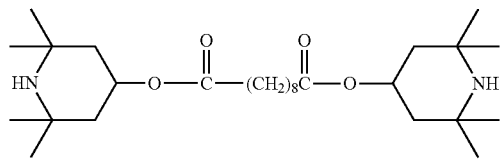

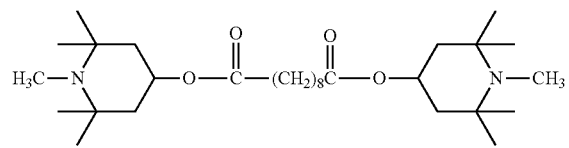

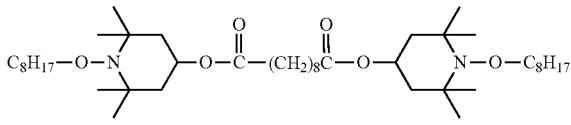

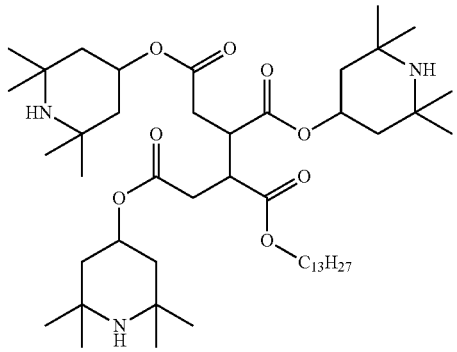

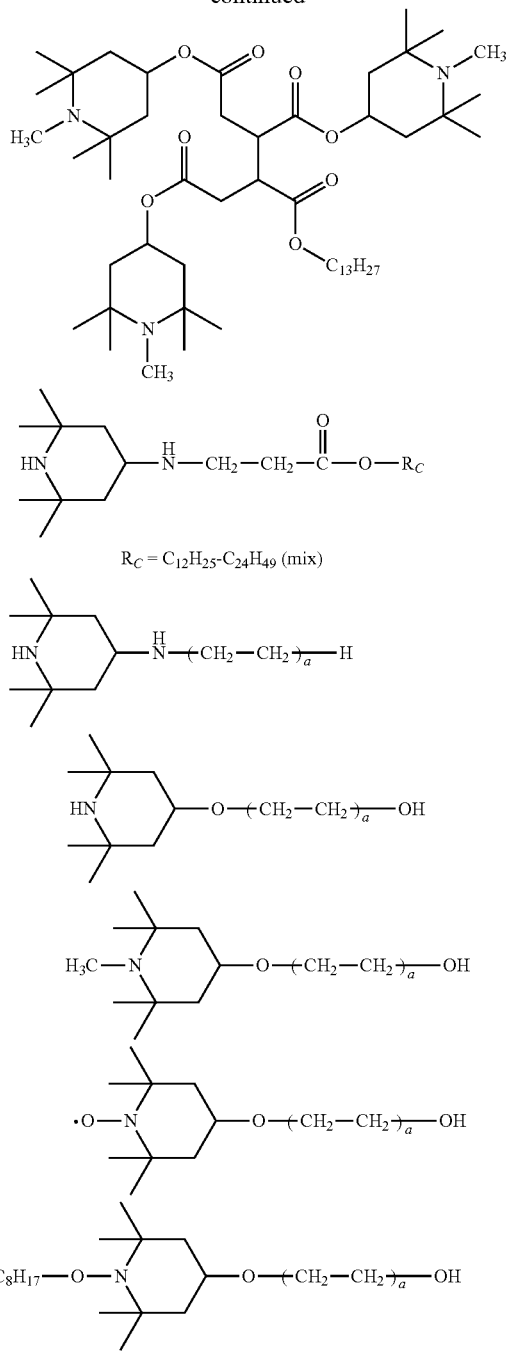

Out of the compounds represented by Formula (1) above, compounds in which $R^3$ in Formula (3) is the branched or linear alkoxy group having 1 to 30 carbon atoms have low basicity and thus are preferable. In addition, it is preferable that $X^1$ is a mixture of alkyl groups having 8 to 26 carbon atoms.

In a method for synthesizing the compound represented by Formula (1) above, a fatty acid having a predetermined number of carbon atoms and an alcohol having a 2,2,6,6-tetramethyl piperidinol skeleton can be used together and reacted. For example, esterification can be achieved through direct esterification between an acid and an alcohol, reaction between an acid halide and an alcohol, ester exchange reaction, or the like, and distillation, recrystallization, a method using a filtering material or an adsorbent, or the like can be used as a purification method as appropriate.

Examples of the phenol-based antioxidant that has a melting point of 100° C. or lower and serves as the above compound (B) include 2,6-di-tert-butyl-p-cresol (melting point: 69 to 73° C.), 2-methyl-4,6-bis(octylthiomethyl)phenol (liquid at ordinary temperature), 2,4-dimethyl-6-(1-methylpentadecyl)phenol (liquid at ordinary temperature), octyl-3,5-di-tert-butyl-4-hydroxy-hydrocinnamate (liquid at ordinary temperature), 3,4-dihydro-2,5,7,8-tetramethyl-2-(4,6,12-trimethyltridecyl)-2H-1-benzopyran6-ol (vitamin E; oil at ordinary temperature), ethylenebis(oxyethylene)bis-(3-(5-tert-butyl-4-hydroxy-m-tolyl)-propionate) (melting point: 76 to 79° C.), and stearyl(3,5-di-tert-butyl-4-hydroxyphenyl)propionate (melting point: 50 to 55° C.).

In the present invention, it is preferable that the phenol-based antioxidant serving as the above compound (B) is a phenol compound represented by Formula (5) below.

[Chem. 16]

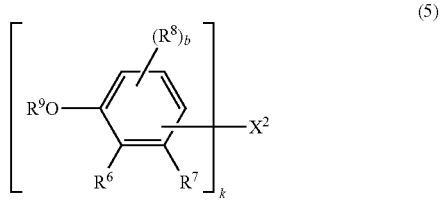

(5)

(In the formula, $R^6$, $R^7$, and $R^8$ independently represent a hydrogen atom or a hydrocarbon group having 1 to 10 carbon atoms, b represents an integer between 0 to 2, and when b is 2, a plurality of $R^8$s are optionally the same or different.

k represents an integer between 1 to 4;

when k is 1, $X^2$ represents a branched or linear alkyl group having 1 to 40 carbon atoms, an alkoxy group having 1 to 40 carbon atoms, an aryl group having 6 to 40 carbon atoms, an arylenealkyl group having 7 to 40 carbon atoms, or a combination thereof, and $R^9$ represents a hydrogen atom;

when k is 2, $X^2$ represents an alkylidene group having 1 to 40 carbon atoms or an arylene group having 6 to 40 carbon atoms, and RP represents a hydrogen atom or a hydrocarbon group having 1 to 10 carbon atoms, and at least one RP represents a hydrogen atom;

when k is 3, $X^2$ represents an alkanetriyl group having 1 to 40 carbon atoms or a trivalent cyclic group having 6 to 40 carbon atoms, and $R^9$ represents a hydrogen atom or a hydrocarbon group having 1 to 10 carbon atoms, and at least one RP represents a hydrogen atom;

when k is 4, $X^2$ represents an alkanetetrayl group having 1 to 40 carbon atoms, and $R^9$ represents a hydrogen atom or a hydrocarbon group having 1 to 10 carbon atoms, and at least one $R^9$ represents a hydrogen atom; and a methylene group in the above-mentioned alkyl group, alkoxy group, arylenealkyl group, alkylidene group, alkanetriyl group, and alkanetetrayl group is optionally substituted with >C=O, —O—, —S—, —CO—O—, —O—CO—, —O—CO—O—, —NR$^{10}$—, phosphine, phosphinite, phosphonite, phosphite, phosphorane, phosphonate, phosphite, or a combination thereof, and these groups are optionally branched. $R^{19}$ represents a hydrogen atom or a branched or linear alkyl group having 1 to 4 carbon atoms.)

The hydrocarbon group having 1 to 10 carbon atoms represented by $R^8$, $R^7$, and $R^8$ in Formula (5) refers to a functional group constituted by carbon atoms and hydrogen atoms, and examples of the molecular structure thereof include alkane, alkene, cycloalkane, and aromatic hydrocarbon. These hydrocarbon groups are optionally interrupted by an oxygen atom, a sulfur atom, a carbonyl group, an ester group, an amide group, an imino group, or an aryl group, and a hydrogen atom in the hydrocarbon group is optionally substituted with a substituent described below. The interruption or substitution may be used in combination.

In the present invention, $R^8$, $R^7$, and $R^8$ above are preferably an alkyl group or a phenyl group, and more preferably a group selected from the group consisting of methyl, butyl, tert-butyl, amyl, tert-amyl, cycloalkyl, methylcycloalkyl, and 2-phenyl-propan-2-yl.

In particular, a compound in which both $R^6$ and $R^7$ are not a hydrogen atom can provide excellent thermal resistance to an organic material and thus is particularly preferable.

Examples of the branched or linear alkyl group having 1 to 40 carbon atoms represented by $X^2$ in Formula (5) include methyl, ethyl, propyl, iso-propyl, cyclopropyl, butyl, sec-butyl, tert-butyl, iso-butyl, amyl, iso-amyl, tert-amyl, cyclopentyl, 4-ethyl-2-methylheptyl, hexyl, 2-methylhexyl, 3-methylhexyl, cyclohexyl, 4-methylcyclohexyl, 2,4-dimethylhexyl, cyclohexyl, 1,2,4-trimethylcyclohexyl, heptyl, 2-heptyl, 3-heptyl, iso-heptyl, tert-heptyl, 1-octyl, iso-octyl, tert-octyl, nonyl, isononyl, decyl, undecyl, dodecyl, tridecyl, isotridecyl, tetradecyl, pentadecyl, hexadecyl, heptadecyl, octadecyl, icosyl, adamantyl, and norbornyl. It is preferable that the alkyl group represented by $X^2$ has 1 to 30 carbon atoms.

It is preferable that the alkoxy group having 1 to 40 carbon atoms represented by $X^2$ in Formula (5) is branched or linear, and examples thereof include methyloxy, ethyloxy, iso-propyloxy, butyloxy, sec-butyloxy, tert-butyloxy, iso-butyloxy, amyloxy, iso-amyloxy, tert-amyloxy, hexyloxy, 2-hexyloxy, 3-hexyloxy, cyclohexyloxy, 4-methylcyclohexyloxy, heptyloxy, 2-heptyloxy, 3-heptyloxy, iso-heptyloxy, tert-heptyloxy, 1-octyloxy, iso-octyloxy, and tert-octyloxy.

Examples of the aryl group having 6 to 40 carbon atoms represented by $X^2$ in Formula (5) include phenyl, naphthyl, anthracenyl, phenanthryl, fluorenyl, indenyl, 2-methylphenyl, 3-methylphenyl, 4-methylphenyl, 4-vinylphenyl, 3-iso-propylphenyl, 4-iso-propylphenyl, 4-butylphenyl, 4-iso-butylphenyl, 4-tert-butyl-phenyl, 4-hexylphenyl, 4-cyclohexylphenyl, 4-octylphenyl, 4-(2-ethylhexyl)phenyl, 4-stearylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-amylphenyl, 2,5-di-tert-octylphenyl, 2,4-dicumylphenyl, 4-cyclohexylphenyl, (1,1'-biphenyl)-4-yl, 2,4,5-trimethylphenyl, and ferrocenyl. It is preferable that the aryl group represented by $X^2$ has 1 to 30 carbon atoms.

Examples of the arylenealkyl group having 7 to 40 carbon atoms represented by $X^2$ in Formula (5) include benzyl, 1-methyl-1-phenylethyl, 2-phenyl-propan-2-yl, 1-naphthylmethyl, 9-anthracenylmethyl, fluorenyl, indenyl, 9-fluorenylmethyl, 2-phenylpropan-2-yl, diphenylmethyl, triphenylmethyl, phenethyl, styryl, and cinnamyl.

The alkylidene group having 1 to 40 carbon atoms represented by $X^2$ in Formula (5) is a group obtained by removing one hydrogen atom from the above-mentioned alkyl groups having 1 to 40 carbon atoms shown as examples. It is preferable that the alkylidene group represented by X2 has 1 to 30 carbon atoms.

Examples of the alkanetriyl group having 1 to 40 carbon atoms represented by $X^2$ in Formula (5) include groups obtained by removing two hydrogen atoms from the above-mentioned alkyl groups shown as examples. It is preferable that the alkanetriyl group represented by $X^2$ has 1 to 30 carbon atoms.

Examples of the alkanetetrayl group having 1 to 40 carbon atoms represented by $X^2$ in Formula (5) include groups obtained by removing three hydrogen atoms from the above-mentioned alkyl groups having 1 to 40 carbon atoms shown as examples. It is preferable that the alkanetetrayl group represented by $X^2$ has 1 to 30 carbon atoms.

In the present invention, a methylene group in the alkyl group, alkoxy group, arylenealkyl group, alkylene group, alkylidene group, alkanetriyl group, and alkanetetrayl group is optionally substituted with >C=O, —O—, —S—, —CO—O—, —O—CO—, —O—CO—O—, —NR$^{10}$—, phosphine, phosphinite, phosphonite, phosphite, phosphorane, phosphonate, phosphite, or a combination thereof, and these groups are optionally branched. $R^{10}$ represents a hydrogen atom or a branched or linear alkyl group having 1 to 4 carbon atoms.

In the present invention, a hydrogen atom in the alkyl group, alkoxy group, arylenealkyl group, alkylene group, alkylidene group, alkanetriyl group, and alkanetetrayl group is optionally substituted with a substituent below.

Examples of the substituent with which a hydrogen atom in the above-mentioned alkyl group, alkoxy group, arylenealkyl group, alkylene group, alkylidene group, alkanetriyl group, and alkanetetrayl group is substituted include: ethylenically unsaturated groups such as vinyl, allyl, acryl, and methacryl; halogen atoms such as fluorine, chlorine, bromine, and iodine; acyl groups such as acetyl, 2-chloroacetyl, propionyl, octanoyl, acryloyl, methacryloyl, phenylcarbonyl (benzoyl), phthaloyl, 4-trifluoromethylbenzoyl, pivaloyl, salicyloyl, oxaloyl, stearoyl, methoxycarbonyl, ethoxycarbonyl, tert-butoxycarbonyl, n-octadecyloxycarbonyl, and carbamoyl; acyloxy groups such as acetyloxy and benzoyloxy; substituted amino groups such as amino, ethylamino, dimethylamino, diethylamino, butylamino, cyclopentylamino, 2-ethylhexylamino, dodecylamino, anilino, chlorophenylamino, toluidino, anisidino, N-methyl-anilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, t-butoxycarbonylamino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino, and phenylsulfonylamino; a sulfonamide group, a sulfonyl group, a carboxyl group, a cyano group, a sulfo group, a hydroxyl group, a nitro group, a mercapto group, an imido group, a carbamoyl group, a sulfonamide group, a phosphonate group, and a phosphate group, or salts of a carboxyl group, a sulfo group, a phosphonate group, and a phosphate group.

In the present invention, a hydrogen atom of each of the substituents may be substituted with a substituent unless otherwise stated.

Examples of the arylene group having 6 to 40 carbon atoms represented by $X^2$ in Formula (5) include groups obtained by removing one hydrogen atom of the aromatic moiety in the above-mentioned groups shown as the examples of the aryl group having 6 to 40 carbon atoms, and groups obtained by substituting these groups with a substituent described later.

Examples of the trivalent cyclic group having 6 to 40 carbon atoms represented by $X^2$ in Formula (5) include groups obtained by removing two hydrogen atoms of the aromatic moiety in the above-mentioned groups shown as the examples of the aryl group having 6 to 40 carbon atoms, groups having an isocyanuric ring, groups having a triazine ring, and groups obtained by substituting a hydrogen atom of these groups with a substituent described later.

Examples of the substituent with which a hydrogen atom in the above-mentioned aryl group, arylenealkyl group, arylene group, and the trivalent cyclic group is substituted include: ethylenically unsaturated groups such as vinyl, allyl, acryl, and methacryl; halogen atoms such as fluorine, chlorine, bromine, and iodine; acyl groups such as acetyl, 2-chloroacetyl, propionyl, octanoyl, acryloyl, methacryloyl, phenylcarbonyl (benzoyl), phthaloyl, 4-trifluoromethylbenzoyl, pivaloyl, salicyloyl, oxaloyl, stearoyl, methoxycarbonyl, ethoxycarbonyl, tert-butoxycarbonyl, n-octadecyloxycarbonyl, and carbamoyl; acyloxy groups such as acetyloxy and benzoyloxy; substituted amino groups such as amino, ethylamino, dimethylamino, diethylamino, butylamino, cyclopentylamino, 2-ethylhexylamino, dodecylamino, anilino, chlorophenylamino, toluidino, anisidino, N-methylanilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, t-butoxycarbonylamino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino, and phenylsulfonylamino; a sulfonamide group, a sulfonyl group, a carboxyl group, a cyano group, a sulfo group, a hydroxyl group, a nitro group, a mercapto group, an imido group, a carbamoyl group, a sulfonamide group, a phosphonate group, and phosphorous compounds such as phosphine, phosphinite, phosphonite, phosphite, phosphorane, phosphonate, and phosphite, or salts of a carboxyl group, a sulfo group, a phosphonate group, and phosphorous compounds such as phosphine, phosphinite, phosphonite, phosphite, phosphorane, phosphonate, and phosphite. These groups may be further substituted.

An example of the compound represented by Formula (5) above is stearyl (3,5-di-tert-butyl-4-hydroxyphenyl)propionate.

Examples of the phosphorus-based antioxidant that has a melting point of 100° C. or lower and serves as the above compound (B) include compounds such as bis[2,4-di-tert-butyl-6-methylphenyl]ethyl ester phosphite (melting point: 89 to 92° C.), tetrakis(2,4-di-tert-butylphenyl)[1,1-biphenyl]-4,4'-diyl bisphosphonite (melting point: 75 to 95° C.), 3,9-bis(octadecyloxy)-2,4,8,10-tetraoxa-3,9-diphosphaspiro[5.5]undecane (softening point: 50 to 62° C.), 4-nonylphenylphosphite (liquid at ordinary temperature), 4,4'-isopropylidenediphenol C12-C15 alcohol phosphite (liquid at ordinary temperature), 2-ethylhexyldiphenylphosphite (liquid at ordinary temperature), diphenylisodecylphosphite (liquid at ordinary temperature), triisodecylphosphite (liquid at ordinary temperature), and triisododecylphosphite (liquid at ordinary temperature).

In the present invention, it is preferable that the phosphorus-based antioxidant serving as the above compound (B) is a compound represented by Formula (6) or (7) below.

[Chem. 17]

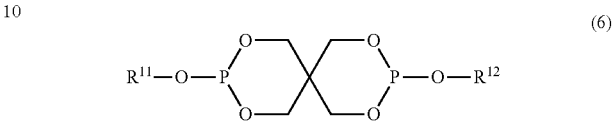

(6)

(In the formula, $R^{11}$ and $R^{12}$ independently represent a branched or linear alkyl group having 1 to 40 carbon atoms or an aryl group having 6 to 40 carbon atoms.)

[Chem. 18]

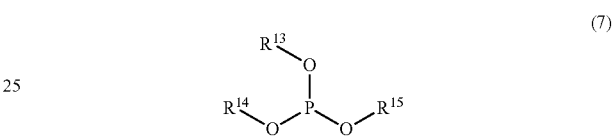

(7)

(In the formula, $R^{13}$, $R^{14}$, and $R^{15}$ independently represent a hydrogen atom, a branched or linear alkyl group having 1 to 40 carbon atoms, an aryl group having 6 to 40 carbon atoms, an arylenealkyl group having 7 to 40 carbon atoms, or a heterocycle-containing group having 3 to 25 carbon atoms.)

The branched or linear alkyl group having 1 to 40 carbon atoms and the aryl group having 6 to 40 carbon atoms represented by $R^{11}$ and $R^{12}$ in Formula (6) above are any of those represented by $X^2$ in Formula (5) above.

The branched or linear alkyl group having 1 to 40 carbon atoms, the aryl group having 6 to 40 carbon atoms, and the arylenealkyl group having 7 to 40 carbon atoms represented by $R^{13}$, $R^{14}$, and $R^{15}$ in Formula (7) above are any of those represented by X2 in Formula (5) above.

Examples of the heterocycle-containing group having 3 to 25 carbon atoms represented by $R^{13}$, $R^{14}$, and $R^{15}$ in Formula (7) above include pyridyl, pyrimidyl, pyridazyl, piperidyl, pyranyl, pyrazolyl, triazile, pyrrolyl, quinolyl, isoquinolyl, imidazolyl, benzoimidazolyl, triazolyl, furyl, furanyl, benzofuranyl, thienyl, thiophenyl, benzothiophenyl, thiadiazolyl, thiazolyl, benzothiazolyl, oxazolyl, benzooxazolyl, isothiazolyl, isooxazolyl, indolyl, 2-pyrrolidinon-1-yl, 2-piperidon-1-yl, 2,4-dioxyimidazolidin-3-yl, 2,4-dioxyoxazolidin-3-yl, benzotriazoyl, and groups having an isocyanuric ring.

In the present invention, compounds such as triisodecylphosphite and triisododecylphosphite have an effect of stabilizing a synthetic resin and thus are preferably used as the compounds represented by Formula (6) or (7) above.

Examples of the thioether-based antioxidant that has a melting point of 100° C. or lower and serves as the above compound (B) include compounds such as 4,6-bis(octylthiomethyl)-o-cresol (liquid at ordinary temperature), didodecyl-3,3'-thiodipropionate (melting point: 39 to 41° C.), dioctadecyl-3,3'-thiodipropionate (melting point: 64 to 67° C.), 2,6-di-tert-butyl-4-(4,6-bis(octylthio)-1,3,5-triazin-2-ylamino)phenol (melting point: 91 to 96° C.), 6,6'-di-tert-butyl-2,2'-p-cresol (melting point: 81 to 86° C.), thiodiethylenebis[3-(3,5-di-tert-butyl-4-hydroxyphenyl)propionate] (melting point: 63 to 67° C.), bis[3-(dodecylthio)proprionate]2,2-bis[[3-(dodecylthio)-1-oxopropyloxy]methyl]1,3-propanediyl (melting point: 46 to 52° C.), and ditridecyl 3,3'-thiodipropionate (liquid at ordinary temperature).

In the present invention, compounds represented by Formulas (8) to (10) below provide an excellent stabilizing effect to a synthetic resin and thus are preferably used as the thioether-based antioxidant serving as the compound (B).

[Chem. 19]

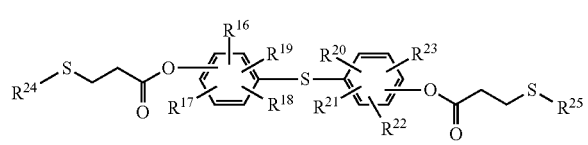

(8)

(In the formula, $R^{16}$ to $R^{23}$ independently represent a branched or linear alkyl group having 1 to 40 carbon atoms, a cycloalkyl group having 3 to 18 carbon atoms, or an aryl group having 6 to 40 carbon atoms, and $R^{24}$ and $R^{25}$ independently represent a branched or linear alkyl group having 1 to 40 carbon atoms.)

[Chem. 20]

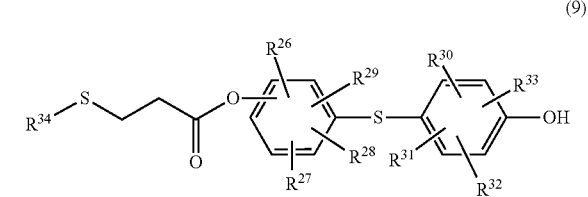

(9)

(In the formula, $R^{26}$ to $R^{33}$ independently represent a hydrogen atom, a branched or linear alkyl group having 1 to 40 carbon atoms, a cycloalkyl group having 3 to 18 carbon atoms, or an aryl group having 6 to 40 carbon atoms, and $R^{34}$ represents a branched or linear alkyl group having 1 to 40 carbon atoms.)

[Chem. 21]

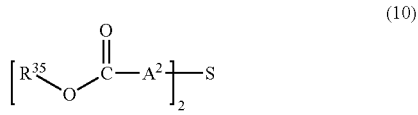

(10)

(In the formula, $R^{35}$ represents a branched or linear alkyl group having 1 to 40 carbon atoms, and $A^2$ represents an alkylene group having 1 to 8 carbon atoms.)

The branched or linear alkyl group having 1 to 40 carbon atoms represented by $R^{16}$ to $R^{35}$ in Formulas (8), (9), and (10) above is any of those represented by $X^2$ in Formula (5) above.

The aryl group having 6 to 40 carbon atoms represented by $R^{16}$ to $R^{23}$ and $R^{26}$ to $R^{33}$ in Formulas (8) and (9) above is any of that represented by X2 in Formula (5) above.

Examples of the cycloalkyl group having 3 to 18 carbon atoms represented by $R^{16}$ to $R^{23}$ and $R^{26}$ to $R^{33}$ in Formulas (8) and (9) above include a cyclopropyl group, a cyclopentyl group, a cyclohexyl group, a cycloheptyl group, a cyclooctyl group, a cyclononyl group, a cyclodecyl group, a cyclododecyl group, and 4-methylcyclohexyl group. A hydrogen atom of the cycloalkyl group is optionally substituted with an alkyl group, an alkoxy group, an alkenyl group, an alkenyloxy group, a hydroxy group, or a cyano group, and the cycloalkyl group is optionally interrupted by an oxygen atom or a sulfur atom.

Examples of the alkylene group having 1 to 8 carbon atoms represented by $A^2$ in Formula (10) above include a methylene group, an ethylene group, a propylene group, a propane-2,2-diyl group, a butylene group, an isobutylene group, a hexylene group, and a heptylene group. The alkylene group is optionally interrupted by an oxygen atom or a sulfur atom.

Examples of the ultraviolet absorber that has a melting point of 100° C. or lower and serves as the above compound (B) include compounds such as polyethylene glycol mono-3-(3-(2H-benzotriazol-2-yl)-5-tert-butyl-4-hydroxyphenyl)-1-oxopropyl ether (liquid at ordinary temperature), 2-(2H-benzotriazol-2-yl)-6-dodecyl-4-methylphenol (liquid at ordinary temperature), 2-(2H-benzotriazol-2-yl)-4-(tert-butyl)-6-(sec-butyl)phenol (melting point: 81 to 84° C.), 2-(2H-benzotriazol-2-yl)-4,6-di-tert-pentylphenol (melting point: 80 to 88° C.), Tinuvin B75 (former product name) manufactured by BASF (liquid at ordinary temperature), and 2-hydroxy-4-octyloxybenzophenone (melting point: 48 to 49° C.).

In the present invention, polyethylene glycol mono-3-(3-(2H-benzotriazol-2-yl)-5-tert-butyl-4-hydroxyphenyl)-1-oxopropyl ether and 2-(2H-benzotriazol-2-yl)-6-dodecyl-4-methylphenol greatly enhance the effect of the present invention and thus can be preferably used as the above-mentioned ultraviolet absorber.

Examples of the flame retardant that has a melting point of 100° C. or lower and serves as the above compound (B) include bisphenol A-bis(diphenylphosphate) (liquid at ordinary temperature) and ADK STAB PFR (product name) manufactured by ADEKA Corporation (liquid at ordinary temperature).

In the present invention, it is preferable that the flame retardant serving as the above compound (B) is a compound represented by Formula (11) below.

[Chem. 22]

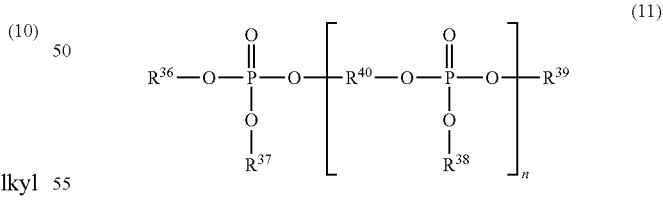

(11)

(In the formula, $R^{36}$ to $R^{39}$ independently represent a hydrogen atom, a branched or linear alkyl group having 1 to 40 carbon atoms, or an aryl group having 6 to 40 carbon atoms, n represents an integer between 1 to 5, and $R^{40}$ represents a bifunctional aromatic group having 6 to 20 carbon atoms.)

The branched or linear alkyl group having 1 to 40 carbon atoms and the aryl group having 6 to 40 carbon atoms represented by $R^{36}$ to $R^{39}$ in Formula (11) above are any of those represented by $X^2$ in Formula (5) above.

Examples of the bifunctional aromatic group having 6 to 20 carbon atoms represented by $R^{40}$ in Formula (11) above include 1,4-phenylene, 2,6-phenylene, 1,4-naphthylene, 2,5-naphthylene, biphenylene, and 4,4'-(propane-2,2-diyl)bisphenylene.

Examples of compounds that have a melting point of 100° C. or lower and serve as the above compound (B) other than the above-mentioned compounds shown as the examples include benzanamine and a reactant (Irganox5057 (former product name) manufactured by BASF; liquid at ordinary temperature) between N-phenyl and 2,4,4-trimethylpentene.

The followings are examples of a method of mixing the styrene-based elastomer (A) with the above compound (B) in the present invention. However, the present invention is not limited to these methods.

(1) A method of mixing the above compound (B) and the styrene-based elastomer (A) that have been brought into a liquid state or fluid state through heating as needed at atmospheric pressure or a reduced pressure to impregnate the styrene-based elastomer (A) with the compound (B).

(2) A method of mixing the above compound (B) in a solid state with the styrene-based elastomer (A) to attach the compound (B), which is still in the solid state, to the styrene-based elastomer (A) at atmospheric pressure or a reduced pressure.

(3) A method of mixing a composition obtained by adding a solvent to the above compound (B) to form a solution or to set the melting point to 100° C. or lower with the styrene-based elastomer (A) at atmospheric pressure or under vacuum and then distilling off the solvent.

(4) A method of causing the styrene-based elastomer (A) to support the above compound (B) on the surface and then applying pressure to fill the pores in the styrene-based elastomer (A) with the compound (B).

(5) A method of veporizing the above compound (B) and then causing the styrene-based elastomer (A) to absorb the compound (B) in a gas state.

In the present invention, the method (1) is preferable because it is relatively easy to mix the above elastomer (A) with the above compound (B).

It should be noted that "impregnation" as used in the present invention refers to impregnation (filling) of pores in a solid with liquid (or infiltration of liquid into pores in a solid), or attachment of minute particles to pores in a solid. In the present invention, it is preferable to impregnate the above elastomer (A) with the above compound (B) as uniformly as possible. Moreover, it is preferable that the above elastomer (A) undergoes surface treatment, drying, and the like such that the elastomer (A) is easily impregnated with the above compound (B).

There is no particular limitation on an apparatus for mixing the above elastomer (A) with the above compound (B), and various mixers, stirring tanks, and rolling tanks can be used. These apparatuses may be provided with a heating and cooling device, a pressure reducing device, a stirring device, a raw material collecting device, an inert gas supplying device, and the like.

The impregnation may be performed in a batch manner, a semi-batch manner, or a continuous manner.

When a temperature of the above compound (B) that is used to mix the above elastomer (A) with the compound (B) exceeds 100° C., the above elastomer (A) may be softened and thus cannot be mixed with the compound (B). Therefore, it is preferable to mix the above elastomer (A) with the above compound (B) at a temperature at which the temperature of the compound (B) is 100° C. or lower and the compound (B) is brought into a liquid state or fluid state, and it is more preferable to mix the above elastomer (A) with the above compound (B) at a temperature at which the compound (B) is brought into a liquid state. The elastomer (A) may be mixed with the above compound (B) at a temperature that is lower than the melting point of the above compound (B) while the above compound (B) maintains a liquid state or fluid state after being heated and brought into a liquid state or fluid state. In the present invention, it is preferable to use a method of mixing the elastomer (A) with the above compound (B) at a temperature at which the above compound (B) does not deteriorate or volatilize, and it is more preferable to set the temperature to 15 to 60° C. from the viewpoint that a favorable working environment is maintained. A preferred temperature (preferred upper limit and range) of the above elastomer (A) that is used to mix the elastomer (A) with the above compound (B) is the same as the preferred temperature (preferred upper limit and range) of the above compound (B) that is used to mix the above elastomer (A) with the compound (B).

In the present invention, the above elastomer (A) is mixed with the above compound (B) at a specific ratio to form a resin additive composition. This makes it possible to handle, as a solid, the above compound (B), which is a low melting point compound that is in a liquid state or fluid state at ordinary temperature. "Possible to handle, as a solid," as used herein do not necessarily require the resin additive composition to be in a solid state, and the resin additive composition may be a mixture of a solid and a liquid or a fluid.

Regarding the content of the above compound (B) in the above elastomer (A), 100 parts by mass of the above elastomer (A) is mixed with 50 to 250 parts by mass of the above compound (B). The content of the above compound (B) is preferably 60 to 200 parts by mass, and more preferably 70 to 150 parts by mass.

If the content of the above compound (B) is smaller than the above range, the influence on the above elastomer (A) may increase when the resin additive composition of the present invention is blended into a synthetic resin, and if the content of the above compound (B) is larger than the above range, the above compound (B) may flow out of the above elastomer (A).

When the above elastomer (A) is impregnated with the above compound (B), it is preferable to perform adjustment such as performing impregnation under a reduced pressure so that there is no gas in a void in the above compound (A). Moreover, the resin additive composition of the present invention may contain known resin additives (e.g., a phenol-based antioxidant, a phosphorus-based antioxidant, a thioether-based antioxidant, an ultraviolet absorber, a hindered amine compound, a nucleating agent, a flame retardant, a flame retardant assistant, a lubricant, a filler, metallic soap, a hydrotalcite, an antistatic agent, a pigment, and a dye) other than the above (B) components as long as the effect of the present invention is not impaired.

Examples of the phenol-based antioxidant other than the above (B) components include 1,3,5-tris[[3,5-bis(1,1-dimethylethyl)-4-hydroxyphenyl]methyl]-1,3,5-triazine-2,4,6 (1H,3H,5H)trione, 1,1,3-tris(2-methyl-4-hydroxy-5-tert-butylphenyl)butane, 4,4'-butylidenebis(6-tert-butyl-m-cresol), pentaerythritol tetrakis[3-(3,5-di-tert-butyl-4-hydroxyphenyl)propionate], 3,9-bis[1,1-dimethyl-2-[β-(3-tert-butyl-4-hydroxy-5-methylphenyl)propionyloxy]ethyl]2,4,8,10-tetraoxaspiro[5,5]-undecane, and 1,3,5-trimethyl-2,4,6-tris(3', 5'-di-tert-butyl-4'-hydroxybenzyl)benzene.

Examples of the phosphorus-based antioxidant other than the above (B) components include 3,9-bis(2,6-di-tert-butyl- 4-methylphenoxy)-2,4-8,10-tetraoxa-3,9-diphosphaspiro [5.5]undecane, 2,4,8,10-tetrakis(1,1-dimethylethyl)-6-[(2-ethylhexyl)oxy]12H-dibenzo[d,g][1,3,2]dioxaphosphocine, and tris(2,4-di-tert-butylphenyl)phosphite.

Examples of the ultraviolet absorber other than the above (B) components include 2-(2-hydroxy-5-tert-octylphenyl) benzotriazole, 2,2'-methylenebis[6-(benzotriazol-2-yl)-4-tert-octylphenol], 2-(2-hydroxy-5-methylphenyl)benzotriazole, 2-(5-chloro-2-benzotriazolyl)-6-tert-butyl-p-cresol, and 2-(5-chloro-2H-benzotriazol-2-yl)-6-tert-butyl-4-methylphenol.

Examples of the nucleating agent include metal carboxylates such as sodium benzoate, aluminum 4-tert-butylbenzoate, sodium adipate, and 2-sodium bicyclo[2.2.1]heptane-2,3-dicarboxylate; metal phosphates such as sodium bis(4-tert-butylphenyl)phosphate, sodium-2,2'-methylenebis(4,6-di-tert-butylphenyl)phosphate, and lithium-2,2'-methylenebis(4,6-di-tert-butylphenyl)phosphate; polyhydric alcohol derivatives such as dibenzylidene sorbitol, bis(m-ethylbenzylidene)sorbitol, bis(3,4-dimethylbenzylidene) sorbitol, bis(p-ethylbenzylidene)sorbitol, and bis(dimethylbenzylidene)sorbitol; and amide compounds such as N,N', N''-tris[2-methylcyclohexyl]-1,2,3-propane tricarboxamide, N,N',N''-tricyclohexyl-1,3,5-benzene tricarboxamide, N,N'-dicyclohexylnaphthalene dicarboxamide, and 1,3,5-tri(dimethylisopropoylamino)benzene.

The blend amount of the known resin additives other than the above (B) components in the resin additive composition of the present invention and the resin additive composition obtained through the production method of the present invention is less than 50 mass %, preferably 30 mass % or less, and more preferably 10 mass % or less, in the resin additive composition.

When the resin additive composition of the present invention is blended into a synthetic resin and molded, known molding methods can be used. For example, when the synthetic resin is a thermoplastic resin, molded articles can be obtained by using an injection molding method, an extrusion molding method, a blow molding method, a vacuum molding method, an inflation molding method, a calendering molding method, a slash molding method, a dip molding method, a foaming molding method, or the like.

When the synthetic resin is a curable resin that can be cured by heat, light, radiation, or the like, molded articles can be obtained by using a compression molding method, an injection molding method, a low-pressure molding method, a laminate molding method, or the like.

Examples of the above-mentioned synthetic resin include α-olefin polymers such as polypropylene, high-density polyethylene, low-density polyethylene, linear low-density polyethylene, polybutene-1, and poly-3-methylpentene; polyolefins and copolymers thereof such as an ethylene-vinyl acetate copolymer, an ethylene-ethyl acrylate copolymer, an ethylene-methyl acrylate copolymer, an ethylene-acrylic acid copolymer, an ethylene-methacrylic acid copolymer, an ethylene-vinyl alcohol copolymer, and an ethylene-propylene copolymer; halogen-containing resins such as polyvinyl chloride, polyvinylidene chloride, chlorinated polyethylene, chlorinated polypropylene, polyvinylidene fluoride, chlorinated rubber, a vinyl chloride-vinyl acetate copolymer, a vinyl chloride-ethylene copolymer, a vinyl chloride-vinylidene chloride copolymer, a vinyl chloride-vinylidene chloride-vinyl acetate terpolymer, a vinyl chloride-acrylic ester copolymer, a vinyl chloride-maleic ester copolymer, and vinyl chloride-cyclohexylmaleimide copolymer; a petroleum resin; a coumarone resin; polystyrene; polyvinyl acetate; an acrylic resin; copolymers (e.g., an AS resin, an ABS resin, an MBS resin, and thermal resistant ABS resin) between styrene and/or α-methylstyrene and another monomer (e.g., maleic anhydride, phenylmaleimide, methyl methacrylate, butadiene, and acrylonitrile); linear polyesters such as polymethyl methacrylate, polyvinyl alcohol, polyvinyl formal, polyvinyl butyral, polyethylene terephthalate, and polybutylene terephthalate; polyamides such as polyphenylene oxide, polycaprolactam, and polyhexamethylene adipamide; thermoplastic resins and blends thereof such as polycarbonate, polycarbonate/ABS resin, branched polycarbonate, polyacetal, polyphenylene sulfide, polyurethane, triacetyl cellulose, and a fibrous resin; and thermosetting resins such as a phenol resin, a urea resin, a melamine resin, an epoxy resin, and an unsaturated polyester resin. Furthermore, an elastomer such as isoprene rubber, butadiene rubber, acrylonitrile-butadiene copolymer rubber, or styrene-butadiene copolymer rubber may be used. These synthetic resins may be used alone or by mixing two or more. It is preferable to use a resin other than a styrene-based elastomer as the synthetic resin.

The α-olefin polymers such as polypropylene, high-density polyethylene, low-density polyethylene, linear low-density polyethylene, polybutene-1, and poly-3-methylpentene greatly enhance the effect of the present invention and thus can be preferably used as the above-mentioned synthetic resin. In particular, polyethylene such as high-density polyethylene, low-density polyethylene, or linear low-density polyethylene is likely to provide the resin additive function of the (B) component and thus can be preferably used.

It is desirable that the resin additive composition of the present invention or the resin additive composition obtained through the production method of the present invention is blended such that the blend amount of the above (B) component is 0.01 to 10 parts by mass with respect to 100 parts by mass of the above-mentioned synthetic resin. If the blend amount is less than 0.01 parts by mass, effects that are provided by the addition of the (B) component are not exhibited in some cases, and if the blend amount is more than 10 parts by mass, dose-dependent effects are not obtained in some cases, which causes wastefulness.

EXAMPLES

Hereinafter, the present invention will be described by way of examples and comparative examples. The present invention is not limited to the following examples and the like. It should be noted that, regarding the materials used in the descriptions below, when temperatures prior to mixing with other materials are not mentioned, the temperature prior to mixing is ordinary temperature (25° C.).

Production of Resin Additive Composition

Examples 1-1 and 1-2, Comparative Examples 1-1 and 1-2

ADK STAB LA-81 (product name; liquid at ordinary temperature) manufactured by ADEKA Corporation, which had been heated to 60° C. and brought into a liquid state in advance, was mixed with 100 parts by mass of each medium (in a powder state) shown in Table 1 in a blend amount shown in Table 1 to impregnate the medium therewith, and thus a resin additive composition was produced.

Comparative Example 1-3

ADK STAB LA-81 was mixed with 100 parts by mass of polypropylene (in a powder state) having an MFR of 8 g/10 min at 230° C. in a blend amount shown in Table 1, granulation was performed through melt kneading at 230° C. using a twin-screw extruder to form a masterbatch, and thus a resin additive composition was obtained.

Comparative Example 1-4

ADK STAB LA-81 was mixed with 100 parts by mass of low-density polyethylene (in a powder state) having an MFR of 1 g/10 min at 200° C. in a blend amount shown in Table 1, granulation was performed through melt kneading at 200° C. using a twin-screw extruder to form a masterbatch, and thus a resin additive composition was obtained.

Retaining Properties 200 g of each of the resin additive compositions obtained in Examples 1-1 and 1-2 and Comparative Examples 1-1 to 1-4 was placed in a beaker and allowed to stand at ordinary temperature (20 to 25° C.) for one month, and then the surface state was observed. The case where the flow of the resin additive (LA-81) out of the surface of the resin additive composition was observed was evaluated as "Poor", and the case where the external appearance did not change was evaluated as "Good". Table 1 shows the results.

TABLE 1

| | Medium | Resin additive having a melting point of 100° C. or lower | Blend amount (parts by mass) | Production method | Retaining properties |
|---|---|---|---|---|---|
| Ex. 1-1 | SEBS[1] | LA-81[2] | 100 | Impregnation | Good |
| Ex. 1-2 | SEBS[1] | LA-81[2] | 120 | Impregnation | Good |
| Comp. Ex. 1-1 | SEBS[1] | LA-81[2] | 300 | Impregnation | Poor |
| Comp. Ex. 1-2 | PP[3] | LA-81[2] | 10 | Impregnation | Poor |
| Comp. Ex. 1-3 | PP[3] | LA-81[2] | 100 | Masterbatch formation | Poor |
| Comp. Ex. 1-4 | LDPE[4] | LA-81[2] | 10 | Masterbatch formation | Poor |

[1]SEBS: hydrogenated styrene-butadiene-styrene copolymer (polystyrene content: 33 mass %, density: 0.91 g/cm$^3$, hydrogenation rate: 100%)
[2]LA-81: ADK STAB LA-81 (product name) manufactured by ADEKA Corporation; bis(2,2,6,6-tetramethyl-1-undecyloxypiperidin-4-yl) carbonate
[3]PP: homopolypropylene having MFR of 8 g/10 mm (230° C.)
[4]LDPE: low-density polyethylene having MFR of 1 g/10 min (200° C.)

It was found from the results of Comparative Example 1-1 that when more than 250 parts by mass of the compound in a liquid state was blended into 100 parts by mass of the styrene-based elastomer, poor retaining properties were obtained.

It was found from the results of Comparative Example 1-2 that when the production was performed using a medium other than SEBS, poor retaining properties were obtained.

It was found from the results of Comparative Examples 1-3 and 1-4 that the masterbatch was formed using an olefin resin, poor retaining properties were obtained.

Meanwhile, it was found that the resin additive compositions produced through the production method of the present invention (or the resin additive composition of the present invention) had excellent retaining properties.

0.1 parts by mass of tetrakis(3-(3,5-di-tert-butyl-4-hydroxyphenyl)propionyloxymethyl)methane, 0.1 parts by mass of tris(2,4-di-tert-butylphenyl)phosphite, 5 parts by mass of hydrotalcite ("DHT-4V" (product name) manufactured by KISUMA Chemicals), and the "resin additive composition" having any composition of Example 1-1 and Comparative Examples 1-2 to 1-4 shown in Table 1 in such an amount that the content of "ADK STAB LA-81" was 0.4 parts by mass were blended into 100 parts by mass of low-density polyethylene having an MFR of 5.0 g/10 min, MFR being measured in accordance with a test method of JIS K7210, and a density of 0.929 g/cm$^3$, and mixed.

Next, a twin-screw extruder was used to perform granulation at an extrusion temperature of 200° C., and thus pellets were obtained. The obtained pellets were subjected to compression molding for 5 minutes in conditions of 180° C. and 9.8 MPa to produce a film having a thickness of 80 μm. The obtained film was evaluated as described later.

It should be noted that in Comparative Example 2-4, a film was obtained through processing performed in the same blend amount and conditions as those in Example 2-1, except that SEBS was not impregnated with ADK STAB LA-81 but SEBS and ADK STAB LA-81 were separately added to low-density polyethylene in the production process (steps in Example 1-1) of the resin additive composition in Example 2-1.

External Appearance

The obtained film was visually observed. The case where no opacity or no foreign matter was observed was evaluated as "Good", and the case where opacity or foreign matter was observed was evaluated as "Poor". Table 2 below shows the results.

Feed Properties

The case where a feed amount was not stabilized due to blocking at a raw material supplying port or the like during the processing using a twin-screw extruder was evaluated as "Poor", and the case where the raw material could be supplied without particular problems was evaluated as "Good". Table 2 shows the results.

TABLE 2

| | Resin additive composition | External appearance | Feed properties |
|---|---|---|---|
| Ex. 2-1 | Ex. 1-1 | Good | Good |
| Comp. Ex. 2-1 | Comp. Ex. 1-2 | Poor | Poor |
| Comp. Ex. 2-2 | Comp. Ex. 1-3 | Poor | Poor |
| Comp. Ex. 2-3 | Comp. Ex. 1-4 | Poor | Poor |
| Comp. Ex. 2-4 | SEBS (not impregnated with LA-81) | Good | Poor |

It was found from the results of Comparative Examples 2-1 to 2-3 that when the production was performed using a medium other than SEBS, the molded articles had poor external appearances. Moreover, it was found that the resin additive composition having poor retaining properties adversely affected the feed properties. Furthermore, it was found from the results of Comparative Example 2-4 that even when the same components as those of the resin additive composition in Example 1-1 were included, poor feed properties were obtained when SEBS was not impregnated with ADK STAB LA-81.

Meanwhile, it was found that with the resin additive composition of the present invention, the molded article had a favorable external appearance and feed properties.

The invention claimed is:

1. A production method for producing a resin additive composition, the method being a method for handling, as a solid, a compound that can maintain a liquid state or fluid state at 100° C. for 30 minutes or longer, the method comprising mixing 100 parts by mass of a styrene-based elastomer (A) with 50 to 250 parts by mass of a compound (B) that can maintain a liquid state or fluid state at 100° C. for 30 minutes or longer and that is represented by Formula (1):

where $A^1$ represents $-O-(CH_2CH_2)_a-$, $-(OCH_2CH_2)_a-$, $-(CH_2CH_2)_a-O-$, $-(CH_2CH_2O)_a-$, $-CH_2CH_2-(C=O)-$, $-O-(C=O)-$, $-(C=O)-O-$, $-O-(C=O)-O-$, $-NH-$, $-NH-(CH_2CH_2)_a-$, $-NH-CH_2CH_2-(C=O)-O-$, or a combination thereof, a represents an integer from 1 to 100, and j represents an integer from 1 to 4, when j is 1, $X^1$ represents a hydrogen atom, a hydroxy group, a branched or linear alkyl group having 1 to 30 carbon atoms, an alkenyl group having 2 to 30 carbon atoms, or a group represented by Formula (2) or Formula (3), and $R^1$ represents a group represented by Formula (3), when j is 2, $X^1$ represents an alkylidene group having 1 to 40 carbon atoms, and $R^1$ represents a branched or linear alkyl group having 1 to 40 carbon atoms or a group represented by Formula (3), and at least one $R^1$ represents a group represented by Formula (3), when j is 3, $X^1$ represents an alkanetriyl group having 1 to 40 carbon atoms, and $R^1$ represents a branched or linear alkyl group having 1 to 40 carbon atoms or a group represented by Formula (3), and at least one $R^1$ represents a group represented by Formula (3), and when j is 4, $X^1$ represents an alkanetetrayl group having 1 to 40 carbon atoms, and $R^1$ represents a branched or linear alkyl group having 1 to 40 carbon atoms or a group represented by Formula (3), and at least one $R^1$ represents a group represented by Formula (3) excluding a compound having a peroxide structure;

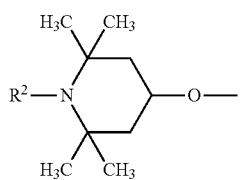

where $R^2$ represents a hydrogen atom, a hydroxy group, a branched or linear alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxy-radical; and

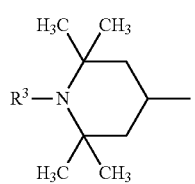

where $R^3$ represents any of the atoms or groups represented by $R^2$ in Formula (2).

2. The production method according to claim 1, wherein the compound (B) in a liquid state or fluid state is mixed with the styrene-based elastomer (A) in a solid state to impregnate the styrene-based elastomer (A) with the compound (B).

3. The production method according to claim 1, wherein the styrene-based elastomer (A) is a hydrogenated styrene-butadiene-styrene copolymer.

4. The production method according to claim 1, wherein the compound (B) is a resin additive having a melting point of 100° C. or lower.

5. The production method according to claim 4, wherein the compound (B) is a compound represented by Formula (4):

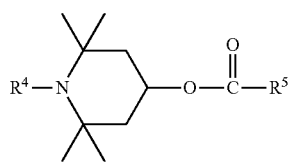

where $R^4$ represents a hydrogen atom, a hydroxy group, a branched or linear alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxy-radical, and $R^5$ represents a branched or linear alkyl group having 1 to 30 carbon atoms, an alkenyl group having 2 to 30 carbon atoms, or a group represented by Formula (2):

[Chem. 14]

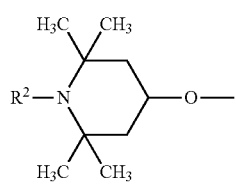

where $R^2$ represents a hydrogen atom, a hydroxy group, a branched or linear alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxy-radical.

6. A resin additive composition comprising 50 to 250 parts by mass of a compound (B) having a melting point of 100° C. or lower with respect to 100 parts by mass of a styrene-based elastomer (A), wherein compound (B) is represented by Formula (1):

(1)

where $A^1$ represents —O—(CH$_2$CH$_2$)$_a$—, —(OCH$_2$CH$_2$)$_a$—, —(CH$_2$CH$_2$)$_a$—O—, —(CH$_2$CH$_2$O)$_a$—, —CH$_2$CH$_2$—(C=O)—, —O—(C=O)—, —(C=O)—O—, —O—(C=O)—O—, —NH—, —NH—(CH$_2$CH$_2$)$_a$—, —NH—CH$_2$CH$_2$—(C=O)—O—, or a combination thereof, a represents an integer from 1 to 100, and j represents an integer from 1 to 4, when j is 1, $X^1$ represents a hydrogen atom, a hydroxy group, a branched or linear alkyl group having 1 to 30 carbon atoms, an alkenyl group having 2 to 30 carbon atoms, or a group represented by Formula (2) or Formula (3), and $R^1$ represents a group represented by Formula (3), when j is 2, $X^1$ represents an alkylidene group having 1 to 40 carbon atoms, and $R^1$ represents a branched or linear alkyl group having 1 to 40 carbon atoms or a group represented by Formula (3), and at least one $R^1$ represents a group represented by Formula (3), when j is 3, $X^1$ represents an alkanetriyl group having 1 to 40 carbon atoms, and $R^1$ represents a branched or linear alkyl group having 1 to 40 carbon atoms or a group represented by Formula (3), and at least one $R^1$ represents a group represented by Formula (3), and when j is 4, $X^1$ represents an alkanetetrayl group having 1 to 40 carbon atoms, and $R^1$ represents a branched or linear alkyl group having 1 to 40 carbon atoms or a group represented by Formula (3), and at least one $R^1$ represents a group represented by Formula (3) excluding a compound having a peroxide structure;

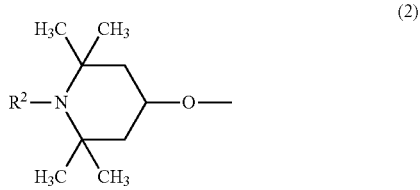
(2)

where $R^2$ represents a hydrogen atom, a hydroxy group, a branched or linear alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxy-radical; and

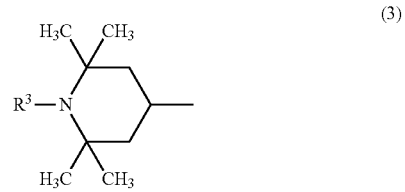
(3)

where $R^3$ represents any of the atoms or groups represented by $R^2$ in Formula (2).

7. The resin additive composition according to claim 6, wherein the styrene-based elastomer (A) is a hydrogenated styrene-butadiene-styrene copolymer.

8. The resin additive composition according to claim 6, wherein the compound (B) is a compound represented by Formula (4):

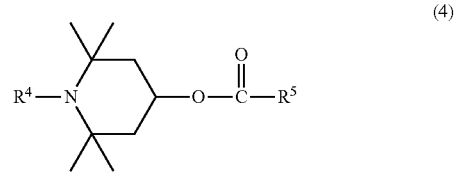
(4)

where $R^4$ represents a hydrogen atom, a hydroxy group, a branched or linear alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxy-radical, and $R^5$ represents a branched or linear alkyl group having 1 to 30 carbon atoms, an alkenyl group having 2 to 30 carbon atoms, or a group represented by Formula (2):

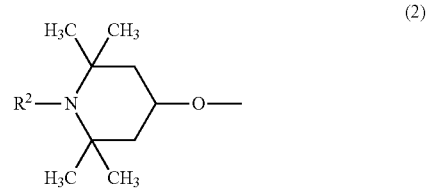
(2)

where $R^2$ represents a hydrogen atom, a hydroxy group, a branched or linear alkyl group having 1 to 30 carbon atoms, a hydroxyalkyl group having 1 to 30 carbon atoms, an alkoxy group having 1 to 30 carbon atoms, a hydroxyalkoxy group having 1 to 30 carbon atoms, or an oxy-radical.

9. The production method according to claim 1, wherein when j is 1, $X^1$ represents a hydrogen atom, a hydroxy group, or a group represented by Formula (2) or Formula (3).

10. The resin additive composition according to claim 6, wherein when j is 1, $X^1$ represents a hydrogen atom, a hydroxy group, or a group represented by Formula (2) or Formula (3).

* * * * *